(12) United States Patent
Tomizaki et al.

(10) Patent No.: US 6,417,277 B1
(45) Date of Patent: Jul. 9, 2002

(54) COATING COMPOSITION

(75) Inventors: Yasuhiro Tomizaki, Chigasaki; Akira Kasari, Hiratsuka, both of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/671,289

(22) Filed: Sep. 27, 2000

(30) Foreign Application Priority Data

Sep. 27, 1999 (JP) ............................................ 11-272628

(51) Int. Cl.$^7$ .......................... C08L 35/00; C08L 35/04; C08L 27/10; C08L 23/00
(52) U.S. Cl. ...................... 525/192; 525/194; 525/205; 525/207; 525/209; 525/221; 525/224; 525/226; 525/227; 525/230; 525/238; 525/239; 525/241; 428/500; 428/513
(58) Field of Search ................................. 525/192, 194, 525/205, 207, 209, 221, 224, 226, 227, 230, 238, 239, 241; 428/500, 513

(56) References Cited

PUBLICATIONS

WPI Abstract Accession No. 1982–02739E & JP 56149467 (Dainippon Toryo KK) Nov. 19, 1981.

WPI Abstract Accession No. 1982–92195D & JP 56141364 (Dainippon Toryo KK) Nov. 5, 1981.

WPI Abstract Accession No. 1983–50778K & JP 58065768 (Dainippon Toryo KK) Apr. 19, 1983.

Primary Examiner—Nathan M. Nutter
(74) Attorney, Agent, or Firm—Wenderoth, Lind & Ponack, L.L.P.

(57) ABSTRACT

The present invention provides a coating composition which is excellent in a curing property (particularly a low temperature curing property) of a coating film and which forms a coating film having excellent chipping resistance and adhesive property, and it comprises a hydroxyl group-containing resin (A), a cross-linking agent (B) and a phosphoric acid group-containing vinyl resin (C).

12 Claims, No Drawings

COATING COMPOSITION

The present invention relates to a coating composition which is excellent in a curing property (particularly a low temperature curing property) of a coating film and which forms a coating film having excellent properties such as a chipping resistance and an adhesive property.

Publicly known is a coating composition prepared by adding a melamine resin or a polyisocyanate compound as a cross-linking agent to a hydroxyl group-containing acryl resin or a hydroxyl group-containing polyester resin, and the above coating composition forms a coating film which is excellent in a smoothness and a weatherability, so that it is widely used as a top coating material for outside plates for car bodies and home electric products. However, these coating materials are requested to be improved further more in coating film performances, and an improvement in particularly a curing property of a coating film, particularly a low temperature curing property, a chipping resistance and an adhesive property is pointed out.

The present inventors have intensively researched a coating composition comprising a hydroxyl group-containing resin and a cross-linking agent for the purpose of improving a curing property, a chipping resistance and an adhesive property of a coating film without reducing a smoothness and a weatherability of the coating film. As a result thereof, they have found that the object described above can be achieved by adding a phosphoric acid group-containing resin to the above coating composition and thus have come to complete the present invention.

Thus, the present invention provides a coating composition comprising a hydroxyl group-containing resin (A), a cross-linking agent (B) and a phosphoric acid group-containing vinyl resin (C).

The coating composition of the present invention shall be explained below in further details.

Component (A): Hydroxyl Group-containing Resin

It is a resin containing at least 2 hydroxyl groups in a molecule and, for example, a hydroxyl group-containing acryl resin and a hydroxyl group-containing polyester resin can suitably be used.

The hydroxyl group-containing acryl resin can be obtained by, for example, copolymerizing a hydroxyl group-containing polymerizable monomer with an acryl base monomer and, if necessary, other polymerizable monomers.

The hydroxyl group-containing polymerizable monomer is a compound having at least one hydroxyl group and at least one polymerizable unsaturated bond in a molecule and includes, for example, monoesters of glycols having 2 or more carbon atoms, preferably 2 to 10 carbon atoms with acrylic acid or methacrylic acid, such as hydroxyethyl (meth)acrylate and hydroxypropyl (meth)acrylate. Further, those obtained by subjecting hydroxyl groups of these monomers to ring-opening addition reaction with cyclic esters such as ε-caprolactam to introduce hydroxyl groups into terminals thereof can also be used as the hydroxyl group-containing polymerizable monomer.

The acryl base monomer includes, for example, esters of acrylic acid or methacrylic acid with monohydric alcohols having 1 to 22 carbon atoms, such as methyl (meth)acrylate, ethyl (meth)acrylate, propyl (meth)acrylate, butyl (meth) acrylate, hexyl (meth)acrylate, octyl (meth)acrylate, lauryl (meth)acrylate and 2-ethylhexyl (meth)acrylate; diesters of glycols having 2 to 10 carbon atoms such as ethylene glycol, propylene glycol and-butylene glycol with acrylic acid or methacrylic acid; and alkoxyalkyl esters having 2 to 18 carbon atoms with acrylic acid or methacrylic acid, such as methoxybutyl (meth)acrylate, methoxyethyl (meth)acrylate and ethoxybutyl (meth)acrylate.

The other polymerizable monomers are compounds having at least one polymerizable unsaturated bond in a molecule excluding the hydroxyl group-containing polymerizable monomers and the acryl base monomers described above and include, for example, styrene, a-methyl styrene, vinyltoluene, acrylonitrile, vinyl acetate, vinyl chloride, acrylic acid, methacrylic acid and maleic acid.

These polymerizable monomers can be copolymerized by a publicly known method, and the hydroxyl-group-containing acryl resin thus obtained can have a number average molecular weight falling in a range of usually 2000 to 50000, particularly 3000 to 20000, a hydroxyl group value falling in a range of 10 to 200 mg KOH/g, particularly 20 to 150 mg KOH/g and an-acid value falling in a range of 80 mg KOH/g or less, particularly 50 mg KOH/g or less.

The hydroxyl group-containing polyester resin can be obtained by, for example, esterifying a polybasic acid with a polyhydric alcohol in a proportion of hydroxyl group excess.

The polybasic acid is a compound having at least 2 carboxyl groups in a molecule and includes, for example, maleic acid, fumaric acid, phthalic acid, isophthalic acid, terephthalic acid, succinic acid, adipic acid, azelaic.acid, sebacic acid, tetrahydrophthalic acid, hexahydrophthalic acid, hexachloro endomethylene tetrahydrophthalic acid, trimellitic acid and their anhydrides. The polyhydric alcohol is a compound having at least 2 hydroxyl groups in a molecule and includes, for example, ethylene glycol, propylene glycol, butylene glycol, hexanediol, diethylene glycol, dipropylene glycol, neopentyl glycol, triethylene glycol, glycerin, trimethylolethane, trimethylolpropane and pentaerythritol.

The polybasic acid can be esterified with the polyhydric alcohol on a hydroxyl group excess condition by a conventional method, and the hydroxyl group-containing polyester resin thus obtained can have a number average molecular weight falling in a range of usually 3000 to 20000, particularly 5000 to 13000, a hydroxyl group value falling in a range of 30 to 150 mg KOH/g, particularly 65 to 120 mg KOH/g and an acid value falling in a range of 80 mg KOH/g or less, particularly 50 mg KOH/g or less.

Further, those obtained by subjecting hydroxyl groups contained in the polyester resins described above to ring-opening addition with cyclic esters such as ε-caprolactam to introduce hydroxyl groups into terminals thereof can also be used as the hydroxyl group-containing resin.

The coating composition of the present invention can be preferably used in water base form, and in the water base form, a carboxyl group is preferably allowed to be present together in these hydroxyl group-containing resins and is neutralized with a basic compound to be made water-soluble or water-dispersible. Capable being used as the basic compound used for neutralization are, for example, hydroxides of alkaline metals or alkaline earth metals, such as sodium hydroxide, potassium hydroxide, lithium hydroxide, calcium hydroxide and barium hydroxide; primary monoamines such as ethylamine, propylamine, butylamine, benzylamine, monoethanolamine, neopentanolamine, 2-aminopropanol and 3-aminopropanol; secondary monoamines such as diethylamine, diethanolamine, di-n- or di-iso-propanolamine, N-methylethanolamine and N-ethylethanolamine; tertiary monoamines such as dimethylethanolamine, trimethylamine, triethylamine, triisopropylamine, methyldiethanolamine and dimethylaminoethanol; and polyamines such as diethylenetriamine, hydroxethylaminoethylamine, ethylaminoethylamine and methylaminopropylamine.

Component (B): Cross-linking Agent

It is intended to react with a hydroxyl group of the hydroxyl group-containing resin which is the component (A) described above to cross-link three-dimensionally the above resin form to cure it and, for example, a melamine resin and a block polyisocyanate compound can be.

An etherified melamine resin obtained by etherifying a part or all of methylol groups of methylol-reduced melamine with monohydric alcohol having 1 to 8 carbon atoms can suitably be used as the melamine resin. The melamine resin can contain 1 to 5 triazine nuclei and has preferably a number average molecular weight falling in a range of usually 300 to 2000. Further, the resins in which the etherification described above is partially made and an etherified methylol group and a methylol group are present together can be used as well.

The block polyisocyanate compound is obtained by blocking isocyanate groups of a polyisocyanate compound with a blocking agent. The polyisocyanate compound has at least two isocyanate groups in a molecule and includes, for example, aromatic diisocyanates such as tolylenediisocyanate, diphenylmetanediisocyanate, xylylenediisocyanate and naphthalenediisocyanate; aliphatic diisocyanates such as tetramethylene-diisocyanate, hexamethylenediisocyanate, dimeric acid diisocyanate and lysine diisocyanate; and alicyclic diisocyanates such as methylenebis(cyclohexylisocyanate), isophoronediisocyanate, methylcyclohexanediisocyanate, cyclohexanediisocyanate and cyclopentanediisocyanate.

Conventionally known compounds can be used as the blocking agent and includes, for example, a phenol base, an oxime base, a lactam base, an active methylene base, an alcohol base, an acid amide base, an imide base, an amine base, an imidazole base, a urea base, a carbamic acid base, an imine base and a mercaptan base.

In the coating composition of the present invention, a structural ratio of the component (A) to the component (B) shall not strictly be restricted and can suitably be changed according to uses of the above coating composition. In general, the component (A) falls suitably in a range of 40 to 90%, particularly 50 to 85% and more particularly 60 to 80%, and the component (B) falls suitably in a range of 60 to 10%, particularly 50 to 15% and more particularly 40 to 20% each based on the total solid matter weight of these both components.

Component (C): Phosphoric Acid Group-containing Vinyl Resin

The phosphoric acid group-containing vinyl resin includes, for example, vinyl resins obtained by polymerizing phosphoric acid group-containing unsaturated monomers, if necessary, together with other polymerizable monomers.

The phosphoric acid group-containing unsaturated monomer is a compound having, for example, at least one polymerizable unsaturated bond and at least one phosphoric acid group represented by the following Formula (1) in a molecule:

—OPO(OH)(R$_1$) (1)

wherein R$_1$ is a hydroxyl group, a phenyl group or an alkyl group having 1 to 20 carbon atoms.

Such phosphoric acid group-containing unsaturated monomer includes, for example, (meth)acryloyloxy(C$_1$ to C$_{20}$)alkyl acid phosphate such as (2-acryloyloxyethyl) acid phosphate, (2-meth-acryloyloxyethyl) acid phosphate, (2-acryloyloxypropyl) acid phosphate, (2-methacryloyloxypropyl) acid phosphate, 10-acryloyloxydecyl acid phosphate and 10-methacryloyloxydecyl acid phosphate. Further, equimolar adducts of glycidyl (meth)acrylate to mono(C$_1$ to C$_{20}$)alkylphosphoric acid can also be used as the phosphoric acid group-containing unsaturated monomer.

Capable of being suitably used as the other polymerizable monomers are the hydroxyl group-containing polymerizable monomers, the acryl base monomers and the other polymerizable monomers which have been given as examples in the description of the hydroxyl group-containing acryl resins in the component (A) described above.

With respect to a ratio of the phosphoric acid group-containing monomer to the other polymerizable monomer in preparing the phosphoric acid group-containing vinyl resin, the phosphoric acid group-containing monomer falls preferably in a range of 10 to 100%, particularly 20 to 80%, and the other polymerizable monomer falls preferably in a range of 90 to 0%, particularly 80 to 20% each based on the total weight of both monomers. The phosphoric acid group-containing vinyl resin has an acid value falling preferably in a range of 10 to 150 mg KOH/g, particularly 20 to 130 mg KOH/g based on a phosphoric acid group of the phosphoric acid group-containing vinyl resin, a number average molecular weight falling in a range of 1000 to 100000, particularly 3000 to 50000 and a hydroxyl group value falling suitably in a range of 5 to 150 mg KOH/g, particularly 10 to 100 mg KOH/g.

A blending proportion of the component (C) in terms of a solid matter ratio falls suitably in a range of 0.1 to 50 parts by weight, particularly 0.5 to 35 parts by weight and more particularly 1 to 20 parts by weight per 100 parts by weight of the total of the component (A) and the component (B).

Coating Composition:

The coating composition of the present invention can be prepared by dissolving or dispersing the hydroxyl group-containing resin (A), the cross-linking agent (B) and the phosphoric acid group-containing vinyl resin (C) each described above in an organic solvent, and a pigment, a UV absorber and a curing catalyst can be added thereto, if necessary.

Capable of being used as the pigment are, for example, color pigments such as titanium oxide, zinc white, carbon black, cadmium red, molybdenum red, chromium yellow, chromium oxide, Prussian blue, cobalt blue, azo pigments, phthalocyanine pigments, quinacridone pigments, isoindoline pigments, threne base pigments and perylene pigments; extender pigments such as talc, clay, kaolin, baryta, barium sulfate, barium carbonate, calcium carbonate, silica and alumina white; and metallic pigments such as aluminum powder, mica powder and mica powder coated with titanium oxide. A blending proportion of the pigment shall not specifically be restricted and falls suitably in a range of 250 parts by weight or less, particularly 1 to 150 parts by weight per 100 parts by weight of the total solid matters of the component (A) and the component (B).

The coating composition of the present invention is particularly useful as a top coating material for outside plates for car bodies and home electric products. The coating composition of the present invention is preferably coated as a top coating material on, for example, a metal-made or plastic-made coated article directly or after coating thereon an undercoating material and an intermediate coating material (this can be omitted). To be specific, the coating composition of the present invention is controlled, for example, by adding water so that the viscosity thereof becomes 20 to 40 seconds/Ford cup #4/20° C., and then it can be coated by means of electrostatic coating, airless spray and air spray. The coating film thickness thereof falls preferably in a range of 10 to 60 µm, particularly 15 to 40 µm in terms of a cured coating film thickness. This coating film can be cured by heating at a temperature of about 60 to about 180° C. for about 10 to about 40 minutes.

The coating composition of the present invention can be used in the forms of a metallic coating material, a solid color coating material, a light-interfering coating material and a clear coating material. Among them, it is most preferably used in the form of a metallic coating material containing aluminum powder.

As described above, the present invention is characterized by further adding the phosphoric acid group-containing vinyl resin (C) to the coating composition comprising the hydroxyl group-containing resin and the cross-linking-agent. As a result thereof, capable of being further improved are a curing property (particularly a low temperature curing property), a chipping resistance and an adhesive property of the coating film without reducing a smoothness and a weatherability of the coating film.

The present invention shall more specifically be explained below with reference to examples and comparative examples. Parts and percentages are based on weight unless otherwise described, and a film thickness of the coating film is based on the cured coating film.

EXAMPLE 1

Polymerized in butyl cellosolve were 15 parts of styrene, 20 parts of methyl methacrylate, 25 parts of ethyl acrylate, 20 parts of butyl acrylate, 15 parts of hydroxyethyl acrylate and 5 parts of acrylic acid using a polymerization initiator α, α'-azobisisobutyronitrile to obtain an acryl resin solution having a resin solid content of 70%. Added to 100 parts of this solution was 4.3 parts of dimethylaminoethanol, and then water was added to obtain an aqueous solution of a hydroxyl group-containing acryl resin (solid content: 55%).

Mixed were 100 parts of this aqueous solution of the hydroxyl group-containing acryl resin, 25 parts of 80% "Cymel 325" (trade name, a melamine resin manufactured by Mitsui Chemicals Inc.), 10 parts of a phosphoric acid-containing vinyl resin (remark 1), 10 parts of Alumi-Paste #4919 (trade name, manufactured by Toyo 30 Aluminum K. K.), 20 parts of Alumi-Paste #55-519 (trade name, manufactured by Toyo Aluminum K. K.) and 30 parts of isopropyl alcohol, and the viscosity was controlled to 16 seconds/Ford cup #4/20° C. with water to obtain the coating composition (water base) of the present invention.

(Remark 1): a phosphoric acid-containing vinyl resin: a copolymer of 30 parts of acidphosphoxyethyl methacrylate, 15 parts of 2-hydroxyethyl acrylate, 20 parts of methyl meth-acrylate, 5 parts of n-butyl acrylate and 30 parts of 2-hydroxy-hexyl methacrylate; a number average molecular weight: 13000, a hydroxy group value: 72 mg KOH/g and an acid value: 126 mg KOH/g.

Comparative Example 1

A coating composition (water base) was obtained in the same manner as in Example 1, except that "10 parts of the phosphoric acid-containing vinyl resin (remark 1)" was removed from the composition prepared in Example 1 described above.

Performance Test Results:

"Elecron #9400" (trade name, polyamide-modified epoxy resin, block polyisocyanate base cationically electrodepositable coating material, manufactured by Kansai Paint Co., Ltd.) was electrodepositablly coated on a zinc phosphate-treated steel plate so that a film thickness became 20 µm, and it was cured by heating at 170° C. for 20 minutes. Then, an intermediate coating material ("Luga Bake Surfacer" trade name, a polyester resin, amino resin base, organic solvent type, manufactured by Kansai Paint Co., Ltd.) was coated thereon so that a film thickness became 40 µm, and it was cured by heating at 140° C. for 30 minutes to obtain a coated article. The coating compositions obtained in Example 1 and Comparative Example 1 described above were coated on the above coated article by air spray so that a film thickness became 15 µm, and it was left standing at a room temperature for 3 minutes. Then, "Magicron Clear" (trade name, an acryl resin-amino resin base, an organic solvent type clear coating material, manufactured by Kansai Paint Co., Ltd.) was coated thereon by air spray so that a film thickness became 35 µm, and it was heated at 140° C. for 30 minutes to cure both coating films at the same time. The coated plate thus obtained was subjected to a coating film performance test. The results thereof are shown in Table 1.

TABLE 1

|  | Example 1 | Comparative Example 1 |
| --- | --- | --- |
| Finish appearance | ○ | Δ |
| Water resistance | ○ | Δ |
| Low temperature curing property | 95 | 88 |
| Chipping resistance | ○ | Δ |
| Recoating adhesive property | 100 | 50 |

The tests were carried out by the following methods.

Finish Appearance:

A glossiness, a build feeling and a smoothness of the coating film were visually evaluated; o shows that all these properties are good; Δ shows that these properties are a little inferior; and× shows that these properties are very inferior.

Water Resistance:

The coated plate was immersed in warm water of 40° C. for 10 days, and then the coated surface was visually observed; o shows that nothing unusual is observed; Δ shows that the coating film is whitened; and× shows that the coating film is notably whitened.

Low Temperature Curing Property:

The coating compositions obtained in Example 1 and Comparative Example 1 described above were coated on a glass plate by air spray so that a film thickness became 20 µm, and it was left standing at a room temperature for 3 minutes, followed by heating at 120° C. for 30 minutes. Then, the coating film was peeled off from the glass plate and extracted in an equivalent weight mixed solvent of acetone and methanol at a refluxing temperature for 5 hours, and then a residual rate (%) of the coating film was calculated.

Chipping Resistance:

"QGR-Gravelo Meter" (trade name, manufactured by Q-Panel Co., Ltd.) was used as a testing machine to blow about 700 g of No. 7 crushed stones of JIS-A5001 against the coated surface at an angle of 45° at an air pressure of 4 kg/cm² in a temperature atmosphere of −20° C. to impact on the coating film, and then the coated surface state was visually observed; o shows that only a few scratches caused by impact are observed on a part of the top coating film; Δ shows that a few scratches caused by impact are observed on the top coating film; and× shows that a lot of scratches caused by impact are observed on the top coating film.

Recoating Adhesive Property:

"Elecron #9400" was electrodepositablly coated on a zinc phosphate-treated steel plate so that a film thickness became 20 μm, and it was cured by heating at 170° C. for 20 minutes. Then, "Luga Bake Surfacer" was coated thereon so that a film thickness became 40 μm, and it was cured by heating at 140° C. for 30 minutes to obtain a coated article. The coating compositions obtained in Example 1 and Comparative Example 1 were coated on the above coated article by air spray so that a film thickness became 15 μm, and it was left standing at a room temperature for 3 minutes. Then, "Magicron Clear" was coated thereon so that a film thickness became 35 μm, and it was heated at 160° C. for 30 minutes to cure both coating films at the same time. Then, the coating compositions obtained in Example 1 and Comparative Example 1 were coated on this clear coated surface by air spray so that a film thickness became 15 μm, and it was left standing at a room temperature for 3 minutes. Then, "Magicron Clear" was coated thereon so that a film thickness became 35 μm, and it was heated at 120° C. for 30 minutes to cure both coating films at the same time to obtain a plural layer coating film. Then, the plural layer coating film was cut by means of a cutter so that it reached the base to form 100 cross-cuts of 1 mm×1 mm. An adhesive cellophane tape was stuck on the coated surface and quickly peeled at 20° C., and then the number of the residual cross-cut coating films was determined.

What is claimed is:

1. A coating composition comprising a hydroxyl group-containing resin (A), a cross-linking agent (B) and a phosphoric acid group-containing vinyl resin (C), said hydroxyl group-containing resin (A) being a hydroxyl group-containing acryl resin having a number average molecular weight falling in a range of 2000 to 50000, a hydroxyl group value falling in a range of 10 to 200 mg KOH/g and an acid value falling in a range of 80 mg KOH/g or less, or a hydroxyl group-containing polyester resin having a number average molecular weight falling in a range of 3000 to 20000, a hydroxyl group value falling in a range of 30 to 150 mg KOH/g and an acid value falling in a range of 80 mg KOH/g or less.

2. The coating composition as described in claim 1, wherein the cross-linking agent (B) is a melamine resin or a block polyisocyanate compound.

3. The coating composition as described in claim 1, comprising the hydroxyl group-containing resin (A) falling in a range of 40 to 90% and the component (B) falling in a range of 60 to 10% each based on the total solid matter weight of the hydroxyl group-containing resin (A) and the cross-linking agent (B).

4. The coating composition as described in claim 1, wherein the phosphoric acid group-containing resin (C) is a vinyl resin obtained by polymerizing a phosphoric acid group-containing unsaturated monomer, with or without other polymerizable monomers.

5. The coating composition as described in claim 4, wherein the phosphoric acid group-containing unsaturated monomer is a compound having at least one polymerizable unsaturated bond and at least one phosphoric acid group represented by the following Formula in a molecule:

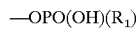

—OPO(OH)(R$_1$)

wherein R$_1$ is a hydroxyl group, a phenyl group or an alkyl group having 1 to 20 carbon atoms.

6. The coating composition as described in claim 4, wherein the phosphoric acid group-containing unsaturated monomer is selected from the group consisting of (2-acryloyloxyethyl) acid phosphate, (2-methacryloyloxyethyl) acid phosphate, (2-acryloyloxypropyl) acid phosphate, (2-methacryloyloxypropyl) acid phosphate, 10-acryloyloxydecyl acid phosphate, 10-methacryloyloxydecyl acid phosphate, and equimolar adducts of glycidyl (meth)acrylate to mono(C$_1$ to C$_{20}$) alkylphosphoric acid.

7. The coating composition as described in claim 1, wherein the phosphoric acid group-containing resin (C) has an acid value falling in a range of 10 to 150 mg KOH/g based on the phosphoric acid group thereof.

8. The coating composition as described in claim 1, wherein the phosphoric acid group-containing resin (C) has a number average molecular weight falling in a range of 1000 to 100000 and a hydroxyl group value falling in a range of 5 to 150 mg KOH/g.

9. The coating composition as described in claim 1, comprising the phosphoric acid group-containing resin (C) falling in a range of 0.1 to 50 parts by weight based the total solid matter weight of the component (A) and the component (B).

10. The coating composition as described in claim 1, being a top coating material.

11. The coating composition as described in claim 1, being a metallic coating material.

12. An article coated with the coating composition as described in claim 1.

* * * * *